Nov. 14, 1950   C. D. VANDERPOOL, JR   2,530,100
FISHING LINE FLOAT
Filed Oct. 17, 1947

Inventor

Clarence D. Vanderpool, Jr.

By Clarence A. O'Brien
and Harvey B. Jacobson
Attorneys

Patented Nov. 14, 1950

2,530,100

UNITED STATES PATENT OFFICE 2,530,100

FISHING LINE FLOAT

Clarence D. Vanderpool, Jr., Towanda, Pa.

Application October 17, 1947, Serial No. 780,335

1 Claim. (Cl. 43—17)

This invention relates to new and useful improvements and structural refinements in floats for fishing lines, and the principal object of the invention is to provide a device of the character herein described, such as may be effectively and conveniently employed for visually indicating to the fisherman that a fish is "biting" on the line.

A further object of the invention is to provide a fishing line float which, being of luminous nature, is particularly adapted for use for fishing at night.

Another object of the invention is to provide a fishing line float which is simple in construction, which may be quickly and easily attached to or detached from the fishing line, and which will effectively assist the fisherman in determining the proper moment when the fishing line should be pulled or tugged.

An additional object of the invention is to provide a float which will readily lend itself to economical manufacture, which will not easily become damaged, and which is well adapted for the purpose for which it is intended.

With the above more important objects in view, and such other objects as may become apparent as this specification proceeds, the invention consists essentially of the arrangement and construction of parts as illustrated in the accompanying drawings, in which.

Like characters of reference are employed to designate like parts in the specification and throughout the several views.

Figures 1, 2:
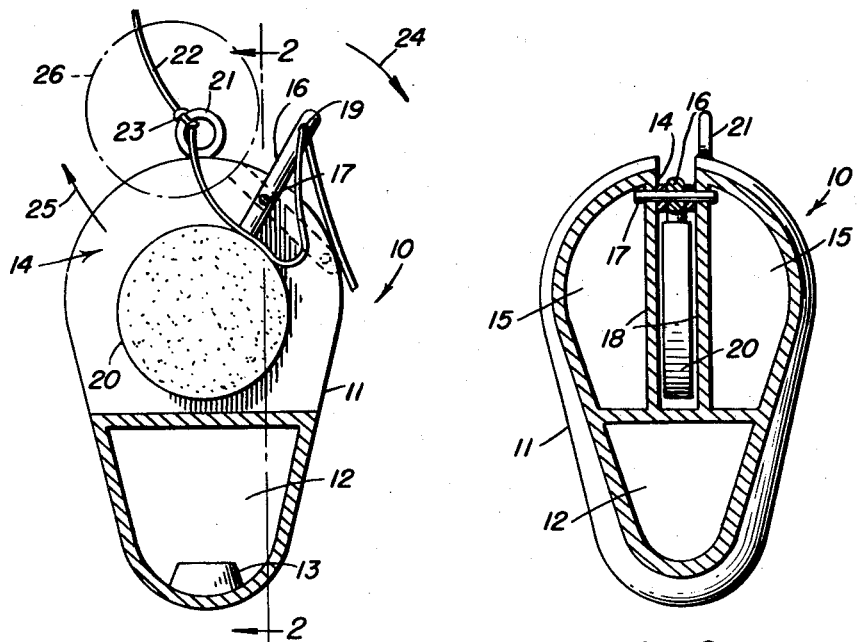
Figure 1 is a cross sectional view of the invention.
Figure 2 is a cross sectional view, taken substantially in the plane of the line 2—2 in Figure 1.
Figures 3, 4:
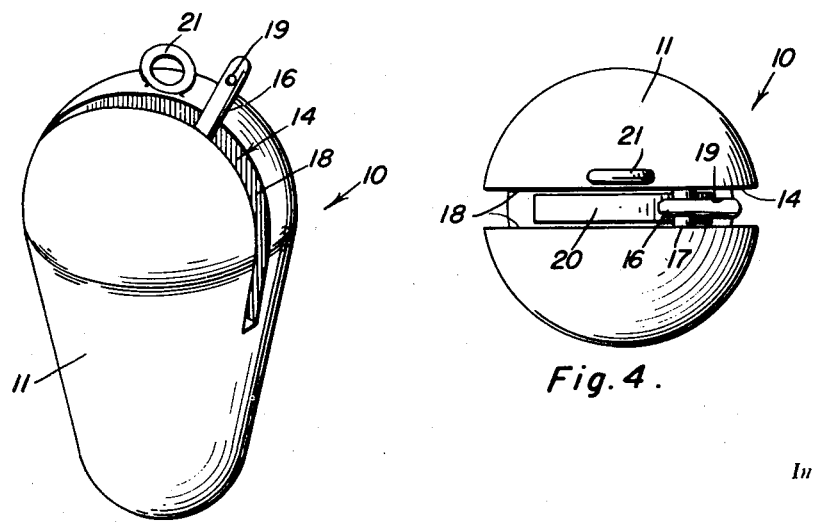
Figure 3 is a perspective view of the invention.
Figure 4 is a top plan view thereof.

Referring now to the accompanying drawings in detail, the invention consists of a fishing line float designated generally by the reference character 10, the same embodying in its construction a body 11 of a substantially conical form longitudinally with curved upper and lower portions, the body 11 being formed from plastic or similar material and possessing sufficient buoyancy so that it will float on the water in a substantially upright position, as shown in the drawings.

If desired, the lower portion of the body may assume the form of a hollow chamber 12 so that proper lightness of the float is assured. Moreover, a suitable weight 13 may be provided in the chamber 12 for the purpose of maintaining the body in a substantially upright position, as will be clearly apparent.

The upper portion of the body 11 is formed with a diametrically extending, transverse slot or recess 14, and if desired, further lightening chambers 15 may be provided at the sides of this slot or recess, as is best shown in Figure 2.

A lever 16 is pivotally mounted upon a shaft 17 which is secured in a pair of side walls 18 defining the aforementioned recess 16, one end portion of the lever 16 normally projecting from the recess 14 of the body 11, and being provided with an aperture 19, the purpose of which will be presently explained.

A signal member assuming the form of a disk of luminous material 20 is secured to the inner, remaining end portion of the lever 16, the disk 20 being normally disposed within the recess 14, as shown.

Finally, a screw eye 21 is provided at the upper end of the body 11, while a conventional fishing line 22 is secured or anchored to this eye, as indicated at 23. This line passes slidably through the aperture 19 of the lever 16, and is ultimately secured to the fishing hook (not shown), a portion of the line between the lever 16 and the eye 21 being slack when the signal member 20 is in its lowered position.

When the device is initially placed in water, a sufficient amount of slack is left in the line between the eye 21 and the aperture 19 of the lever so that a pull on the hook will draw the line through the aperture and simultaneously frictionally engage and move the lever about its shaft, in the direction of the arrow 24, so that the signal member 20 is swung out of the slot, as at 25, to a position exteriorly of the float, as indicated at 26, thus calling the fisherman's attention to the fact that a fish is biting. Of course, by employing lines of different diameters relative to the size of the aperture 19, different frictional effects will be produced on the lever 16.

It will be readily apparent that since the disk 20 is of a luminous character, the float may be effectively employed for night fishing.

Needless to say, as soon as the fish ceases to bite, the disk 20 will automatically recede into the recess 14 under the influence of gravity.

It is believed that the advantages and use of the invention will be clearly apparent from the foregoing disclosure, and accordingly, further description thereof at this point is deemed unnecessary.

Having described the invention, what is claimed as new is:

A float of substantially conical form longitudinally having upper and lower portions curved, a weight in the lower portion, the upper portion having a slot extending from its uppermost point to a point substantially midway of the length of the float and completely across the float to divide the upper portion thereof into two substantially equal parts, an eye secured to one of said parts adjacent the uppermost portion thereof and at substantially the center thereof, a shaft extending across the slot and secured to both parts at positions to one side of the longitudinal center of the float, a signalling device having a lever pivotally mounted on said shaft and provided with an enlarged portion at one side of the shaft and within said slot, and a long narrow portion at the other side of the shaft, said narrow portion having an aperture therein, and a line secured to the eye and passing through said aperture, said line being adapted to have a hook attached thereto, whereby a pull on the hook may cause the swinging of the lever so as to move the enlarged portion out of the slot to a position exteriorly of the float.

CLARENCE D. VANDERPOOL, Jr.

REFERENCES CITED

The following references are of record in the file of this patent:

UNITED STATES PATENTS

| Number | Name | Date |
|---|---|---|
| 1,394,313 | Leeper | Oct. 18, 1921 |
| 1,410,817 | Lloyd | Mar. 28, 1922 |
| 1,667,606 | Romano | Apr. 24, 1928 |
| 1,823,937 | Hatchett | Sept. 22, 1931 |
| 2,201,588 | Kuhns | May 21, 1940 |
| 2,327,789 | Hixon | Aug. 24, 1943 |

OTHER REFERENCES

Popular Mechanics, September 1936; page 456, article title "Float for the Young Fisherman Resembles Boat."